UNITED STATES PATENT OFFICE.

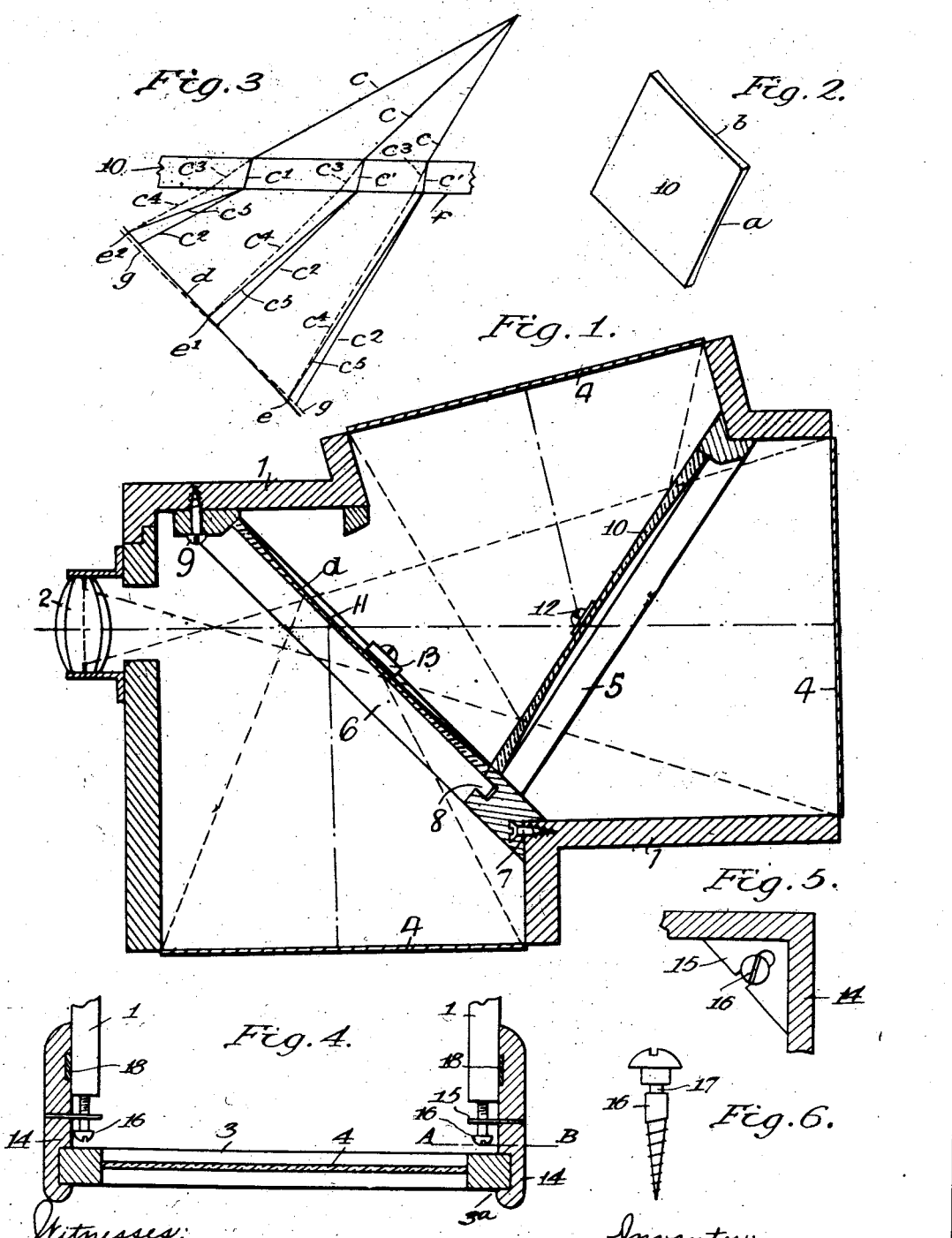

ALFRED DAWSON, OF GREENHITHE, ENGLAND.

PHOTOGRAPHIC CAMERA.

1,214,016.  Specification of Letters Patent.  Patented Jan. 30, 1917.

Application filed February 21, 1913. Serial No. 749,877.

*To all whom it may concern:*

Be it known that I, ALFRED DAWSON, a subject of the King of the United Kingdom of Great Britain and Ireland, residing at Stone Place, Greenhithe, in the county of Kent, England, artist and engraver, have invented a new and useful Photographic Camera, of which the following is a specification.

This invention relates to cameras employed in the art of photography.

In several types of color camera a plurality of color negatives is produced simultaneously at different points with the aid of one or more reflectors which also transmit light. Since the several images produced at the sensitive plates are subsequently superimposed they should be identical but owing to refraction the transmitted images are distorted so that when the several negatives are superimposed the register is not accurate.

Several methods of eliminating distortion and displacement due to refraction so as to produce simultaneously two or more balanced and symmetrical images have been suggested. These methods have in all cases involved the use of correctors having two plane surfaces and in the resulting negatives the error in symmetry or register has not proved under small apertures and in the smaller sizes to be particularly noticeable and therefore has been considered negligible. When dealing with larger sized negatives and large apertures however the error in symmetry is so great as to render the negatives unfit for ordinary commercial or scientific work in which the register must be exceedingly accurate throughout.

The object of the present invention is to rectify beyond unaided visual limits the transmitted images so that all the negatives of any size or under any lens aperture whatever will register when superimposed with sufficient accuracy to render them suitable for all practical commercial and scientific purposes.

This invention consists in the method of compensating for eliminating or correcting distortion due to refraction in multi-plate cameras by interposing between the lens and fixed or universally adjustable sensitive plates light-transmitting elements having curved surfaces serving to produce identical images upon the respective sensitive plates.

The invention also comprises apparatus for carrying out the method as well as further features which will transpire in the following description of the embodiments illustrated in the accompanying drawings, in which:—

Figure 1 is a vertical section partly diagrammatic through one embodiment of the invention. Fig. 2 is a view in perspective of one light-transmitting element. Fig. 3 is a diagram illustrating the action of the element shown in Fig. 2. Figs. 4 and 5 are details of the adjusting mechanism. Fig. 6 is an elevation of a screw used in connection with the adjusting mechanism.

Referring to that embodiment suitable for use as a color camera shown in Figs. 1 to 5 of the drawings 1 indicates the body of a trichrome camera and 2 a lens of suitable aperture. The body contains three so-called pockets 3ª each accommodating a dark slide 3 (Fig. 4 hereinafter referred to) carrying a sensitive plate 4. Within the body two rectangular frames 5 and 6 are arranged at a convenient angle. The frame 5 is notched to fit two of the internal angles of the body and is secured thereto as for instance at 7. The frame 6 is provided with a tongue 8 fitting into a groove in the frame 5 and is secured as at 9 to the body. Both frames are rabbeted to accommodate light-transmitting elements 10 and 11 which are prevented from falling out by clips 12 and 13. With this arrangement the cone of light rays entering the camera is split into three cones or bundles each producing an image at its respective focal plane, at each of which planes a sensitive plate 4 is located. The elements 10 and 11 present plane surfaces toward the lens from which the image is reflected to the upper and lower pockets as indicated by dotted lines. The third image is transmitted through both elements to the plate opposite the lens. The image reflected by the element 10 must pass through the element 11 and in doing so becomes distorted due to refraction. Similarly the image passing through both plates becomes distorted. The distortion is corrected in the following manner: Instead of the elements each having two plane surfaces they are formed as shown in Fig. 2 that is to say with a curved surface on that side remote from the lens. Said surface, constituting what is known in the art as a toric-figured one, is preferably formed by grinding and equalizes the transmitted and the reflected image. The curve in the plane of section of Fig. 1 is indicated at $a$ and the curve in a plane perpendicular thereto at $b$.

The diagram of Fig. 3 will serve to illustrate the construction and action of the elements 10 and 11. This diagram is not drawn to scale but is exaggerated to illustrate more clearly how the correction is obtained. The light rays $c$ impinge upon the element at various angles and are refracted according to a sine law. The amount of correction required to produce an undistorted image at the focal plane $d$ does not however follow a sine law. The paths of the rays through the element are indicated at $c'$ and the emergent rays at $c^2$ that is to say when both sides of the element are plane and parallel to each other. If the rays $c$ were refracted by an amount which would produce a non-distorted image at $d$ they would have directions which for convenience are indicated by the dotted lines at $c^3$ and $c^4$. The paths of these rays can be readily calculated.

Now according to this invention the rays $c^2$ are caused to take the directions indicated at $c^5$ so that they cut the focal plane at $e$, $e'$ and $e^2$ the points where the rays $c^4$ cut the plane to produce a true image. In order to accomplish this the surface $f$ of the element is curved as indicated at $a$ in Fig. 2. The form of this curve depends upon the modification or adjustment required and upon various other conditions such as the focal length of the lens, the width and thickness of the element and the angle at which the latter is set with respect to the optical axis of the lens. An arrangement which was found to give satisfactory results in one experiment will be described by way of example only. The parts were arranged as shown in Fig. 1, the lens having a focal length of ten inches and the dimensions of the elements being four by five inches at about one sixth of an inch thick at the edges. The primary curve $a$ had a radius of about eighty feet and the secondary curve $b$ had a radius of over one hundred feet.

It is a rather difficult matter to work the curved surfaces optically correct since they are not true arcs of circles but owing to the curves being very shallow they are made in practice a true arc of a circle of large radius such that the extreme rays cutting the focal plane at $e$ and $e^2$ are corrected. There is however a slight want of symmetry in that part of the image between these two points which may be compensated or corrected by skewing the focal plane i. e. sensitive plate very slightly on the central axis. This skewing is shown by the dotted line $g$.

The amount of distortion in the direction of the curve $b$ is small and may in some cases be corrected by making the curve $a$ true arc of a circle of considerable radius. In one case the radius of this curve on an element of five inches was about 200 feet. Generally the radii of the curves of the element 10 are shorter than the radii of the curves of the element 11. It will be clear therefore that according to the present invention the curve $a$ may be worked optically correct or in the alternative only approximately correct and then compensated by skewing the sensitive plate.

The mechanism which may be used for adjusting the sensitive plate is shown in Figs. 4 and 5. The dark slide 3 fits in a groove in the frame 14 which latter slides on the extension of the body forming a pocket. The frame 14 is provided with slotted corner plates 15 in the slots of which the screws 16 are placed. The annular groove 17 in the screw forms a housing for the plate 15. A light-tight packing 18 is preferably inserted in a groove in the frame 14. By means of this arrangement the dark slide may be universally adjusted that is to say angularly in every direction and linearly in the direction of the optical axis of the lens or the reflector thereof. Each pocket is fitted with this adjusting mechanism.

An embodiment of the invention has been described above whereby three identical or symmetrical images can be produced each in a separate pocket or slide at one exposure through a single lens and the principles involved therein may be adapted or applied for producing more than three images that is to say by increasing the number of transmission reflectors and adding to the camera a corresponding number of pockets to receive sensitive surfaces.

Various forms and arrangements of elements falling within the scope of this invention will suggest themselves to those acquainted with the art.

The color screens are fixed in the camera as and where required for the special discriminative color analysis desired. The light-transmitting elements may be stained and utilized as color filters. The color screens may be of any kind. A "pack" combination of sensitive plates and color screens may be employed in one or more of the dark slides. The camera may be adapted for stereoscopic work by duplicating the parts and inserting an opaque screen between the parts. The reflecting surface of the first transmission reflector is not intended to be curved or bent.

The expression "multi-plate camera" herein used is intended to include cameras in which one transmitting reflector and two sensitive plates only are exposed either for color or ordinary photography. Moreover the term "sensitive plate" is intended to include all types of sensitive surfaces such as films, etc. Again by "light-transmitting bodies" is meant not only the transmission reflectors but the distortion correctors inserted between the reflectors and the sensitive plates. Finally the expression "identical" is intended to include images which although not corrected or compensated for distortion with mathematical precision are nevertheless corrected to a degree beyond the visual limit of the unaided eye.

It will be understood when color screens are used the images on the respective plates are not strictly "identical" since each plate photographically records different color components of the image. These photographic records of the color components are however identical in the sense that satisfactory registration is obtained.

Having thus described my invention, I claim:—

1. In a multiplate photographic camera, a combined light-transmitting and reflecting element having a toric-figured surface to equalize the transmitted and the reflected image.

2. In a multiplate photographic camera, a plurality of combined light-transmitting and reflecting elements each having a toric-figured surface to equalize the transmitted and the reflected image.

3. In a multiplate photographic camera, a lens, a plurality of sensitized surface supports, a plurality of transparent reflectors each adapted to receive an image from said lens and to project said image upon the sensitized surface carried by the support opposite said reflector, and means for adjusting each of said supports about a substantially central axis.

4. In a multiplate photographic camera, a lens, a plurality of sensitized surface supports, a plurality of transparent reflectors each adapted to receive an image from said lens and to project said image upon its corresponding sensitized surface support, and means for adjusting each of said supports about a substantially central axis, each of said reflectors having a surface distorted to compensate for refraction.

5. In a multiplate photographic camera, a lens, and a combined light-transmitting and reflecting element, said element having a substantially plane surface presented toward the lens and a curved surface remote from the lens.

6. In a multiplate photographic camera, a lens, and a combined light-transmitting and reflecting element, said element having a substantially plane surface presented toward the lens and having the side remote from the lens curved cylindrically in a plurality of directions.

7. In a multiplate photographic camera, a lens, and a combined light-transmitting and reflecting element, said element having a substantially plane surface presented toward the lens and having the side remote from the lens curved cylindrically in two directions disposed at 90 degrees to each other.

8. In a photographic camera, a lens, a plurality of sensitized surface supports, a transparent reflector situated between the lens and each support, said reflector being distorted to equalize the transmitted and reflected images, and means for adjusting each of said supports.

9. In a photographic camera, a lens, a plurality of sensitized surface supports, a transparent reflector situated between the lens and each support, said reflector being distorted to equalize the transmitted and reflected images, and means for adjusting each of said supports angularly and rectilinearly.

10. In a photographic camera, a lens, a plurality of sensitized surface supports, a transparent reflector situated between the lens and each support, said reflector being distorted to equalize the transmitted and reflected images, and means for adjusting each of said supports angularly about a central axis and rectilinearly along the optical axis.

Signed at London this sixth day of February, 1913.

ALFRED DAWSON.

In the presence of—
EYRE COOK TOWNSEND,
VERA MARY LENTON.